United States Patent [19]

Sager

[11] Patent Number: 4,585,152
[45] Date of Patent: Apr. 29, 1986

[54] METHOD AND APPARATUS FOR DEGATING PARTS USING ULTRASONIC ENERGY

[75] Inventor: Thomas B. Sager, Newtown, Conn.

[73] Assignee: Branson Ultrasonics Corporation, Danbury, Conn.

[21] Appl. No.: 681,372

[22] Filed: Dec. 13, 1984

[51] Int. Cl.[4] .................................. B26F 3/00
[52] U.S. Cl. ................................ 225/1; 225/93
[58] Field of Search ............ 225/1, 93; 74/61, 87; 264/23; 51/59 SS

[56] References Cited

U.S. PATENT DOCUMENTS

| | | | |
|---|---|---|---|
| 3,094,814 | 6/1963 | Barke et al. | 51/59 SS |
| 3,157,329 | 11/1964 | Gorter | 225/93 |
| 3,595,453 | 7/1971 | Sherry | 225/1 |

Primary Examiner—Frank T. Yost
Attorney, Agent, or Firm—Philip J. Feig; Ervin B. Steinberg

[57] ABSTRACT

A method and apparatus for degating individual molded thermoplastic parts from runners use the combination of ultrasonic energy at a predetermined frequency and an anvil plate dimensioned to undergo flexural motion of a substantially large motional amplitude at a frequency less than that of the predetermined ultrasonic frequency for degating the parts from runners.

5 Claims, 4 Drawing Figures

METHOD AND APPARATUS FOR DEGATING PARTS USING ULTRASONIC ENERGY

BACKGROUND OF THE INVENTION

This invention relates to a method and apparatus for degating molded parts using acoustic energy and, specifically, refers to a method and apparatus of degating or separating molded parts from a runner using high frequency sonic or ultrasonic energy. Quite specifically, molded thermoplastic parts are degated from a runner which is connected to the molded parts by individual gates using ultrasonic energy and an anvil, the top plate of which is dimensioned to undergo flexural motion of a substantially large motional amplitude at a frequency less than that of the applied sonic or ultrasonic frequency whereby to cause a burn out of the respective gates and freeing of the parts connected to the runner via the gates.

In molding thermoplastic parts, it is common practice to mold simultaneously a plurality of parts which are joined to a runner by means of individual gates. After the molding operation has been completed, the entire assembly comprising one or more runners and the plurality of attached parts is removed from the mold and the individual parts are separated from the runners. This process is known as degating. Degating is generally a manual operation which sometimes results in scarring of the molded part which scar may have to be smoothed off and removed using a mechanical abrading or polishing of the parts.

In addition, methods of degating molded parts from a runner include the use of acoustic energy. For example, in U.S. Pat. No. 3,595,453 entitled "Method of Separating Parts Using High Frequency Energy" an arrangement is shown in which molded parts attached to a runner are disposed upon a resilient support which in turn is disposed on a rigid base. When ultrasonic energy is applied to the runner the molded parts are degated from the runner.

A similar ultrasonic degating method is described in the book "Ultrasonics in Packaging and Plastics Fabrication" by Ralph H. Thomas, Sr., Cahners Books, Boston, Mass. (1974), pages 115-119.

In the prior art the molded parts and runner are placed upon a resilient support to ensure an out-of-phase relationship between the parts and the horn applying the ultrasonic energy.

Under certain conditions, such as when molded parts are to be degated as soon as they are removed from the molding machine while still hot, the degating process according to the prior art has met with varying degrees of success.

In order to improve the success of degating molded hot parts, in the present invention the resilient support and the rigid base are replaced by an anvil the top plate of which is dimensioned to undergo flexural motion of a substantially large amplitude at a frequency less than that of the applied sonic or ultrasonic frequency for causing the molded parts to undergo gross motion while the runner is subjected to sonic or ultrasonic energy for burning out of the respective gates coupling the parts to the runner.

A principal object of this invention, therefore, is the provision of a new and improved method and apparatus for separating a molded part from a runner or gate.

Another object of this invention is the provision of a new and improved method and apparatus for separating molded parts from a runner by the application of ultrasonic energy and use of an anvil the top plate of which is dimensioned to undergo flexural motion.

A further object of this invention is the provision of a new and improved method and apparatus for separating molded parts from a runner by the application of ultrasonic energy and use of an anvil the top plate of which is dimensioned to undergo flexural motion of a substantially large motional amplitude at a frequency less than that of the applied ultrasonic frequency to cause a burnout of the respective gates coupling the parts to the runner.

A still further object of this invention is the provision of a new and improved method and apparatus for degating molded parts from a runner by the application of ultrasonic energy and use of an anvil the top plate of which is dimensioned to undergo flexural motion of a substantially large motional amplitude at a frequency lower than that of the applied ultrasonic frequency to cause a burnout of the respective gates coupling the parts to the runner while the parts are still hot.

Further and still other objects of this invention will become more clearly apparent by reference to the following description when read in conjunction with the accompanying drawings.

DETAILED DESCRIPTION OF THE INVENTION

Figure 1:
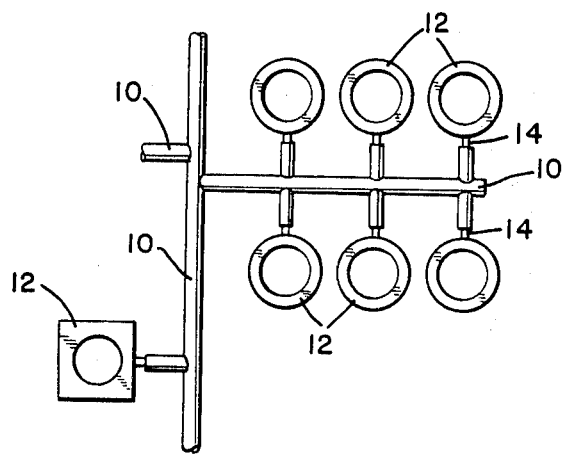
FIG. 1 is plan view of a typical assembly of thermoplastic parts coupled to a runner via respective gates.
Figure 2:
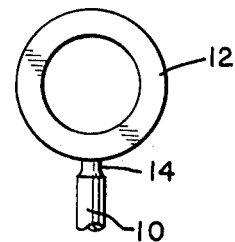
FIG. 2 is an enlarged view of a portion of FIG. 1.

Referring now to the figures and FIGS. 1 and 2 in particular, there is shown a molded assembly having one or more full thermoplastic runners 10 and a plurality of molded parts 12. Each part 12 is joined to a runner 10 by an individual gate 14. The runners may be round or flattened. Flattened runners provide an advantage of better coupling of acoustic energy into the runner. Better coupling is particularly important when degating hot parts which are degated immediately after removal from a mold. The runner and gates may be made of PSD, ABS, PC, SAN, PPO, nylon, acetal, polysulfone, polyimide, polyamide or acrylic plastic material. The design of runners and gates is well known.

While round parts 10 are shown, the invention is equally applicable to parts of any shape, such as square or complex configurations, connected to a runner 10 by means of one or more gates 14.

Normally, each part 12 is broken off from the runner 10, for example by mechanical bending, resulting in a scar or a portion of gate 14 remaining attached to a portion of the part 12 necessitating a subsequent mechanical polishing operation.

The use of ultrasonic energy to cause degating of parts from a runner results in the dissipation of the ultrasonic energy in the gates to cause softening and burning out of the gates, leaving the surface of part 12 completely smooth without any scar. Apparently, the relatively thin gates are heated by the dissipation of ultrasonic energy, causing a softening and possibly a partial vaporization of the thermoplastic material. As used herein the term ultrasonic energy or acoustic energy is meant to include energy in the range from 1 kHz to 100 kHz, and preferably at a frequency of 20 kHz or 40 kHz.

In order to enhance the transfer of the ultrasonic energy into the runner, it has been found advantageous to flatten the side of the runner intended to receive the ultrasonic energy. This improvement is especially useful for degating parts which are still hot from being removed from the molding machine.

Figure 3:
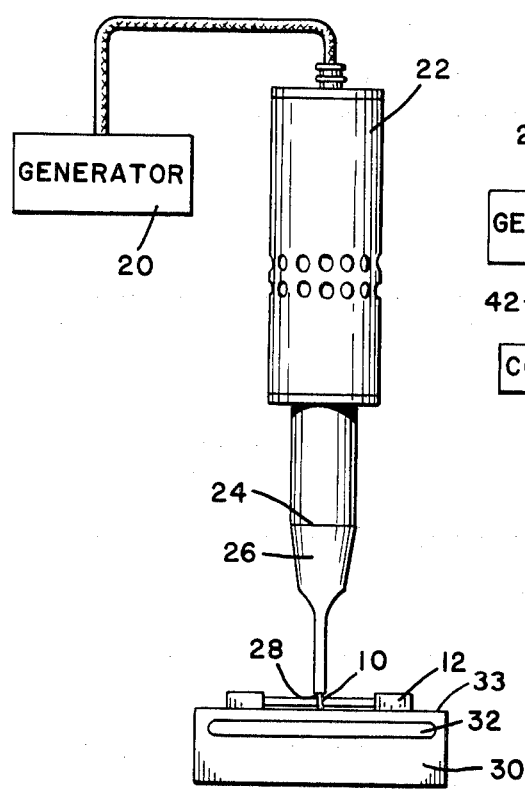
FIG. 3 is a schematic representation showing the method and apparatus of separating or degating molded parts from a runner.

Referring to FIG. 3, an electrical high frequency generator 20 energizes an electroacoustic converter 22 which converts the applied electrical energy to mechanical vibrations in the ultrasonic frequency range. The converter 22 is provided with magnetostrictive or piezoelectric means (not shown) for converting the energy. A typical piezoelectric converter suitable for use is disclosed, for instance, in U.S. Pat. No. 3,524,085 entitled "Sonic Transducer".

The converter output is coupled to the input end 24 of a solid horn 26, also known as a velocity transformer or mechanical amplitude transformer, which amplifies the mechanical amplitude of the vibrations applied at the input surface 24 and transmitted to the output surface 28. In a typical example, the converter is fed with electrical energy at 20 kHz and the horn provides at its output surface mechanical vibrations having a peak-to-peak displacement of several thousandths of an inch.

The thermoplastic parts are disposed on the top of plate 33 of an anvil 30 disposed opposite from the output surface 28 of the horn 26. The plate 33 is formed by a through slot 32 which is located near the top of the anvil 30 and extends to almost both sides of the anvil. In a preferred embodiment the anvil 30 is 2 inches (50.8 mm) high, 16 inches 40.6 cm wide and 1.5 inches (38 mm) deep and the slot is 0.5 inches (12.7 mm) wide located 0.175 inch (4.5 mm) from the top surface of the anvil and extends to within one inch (25.4 mm) from both of the anvil sides. The ends of the slot 32 are rounded to reduce mechanical stress. In a preferred construction the anvil is made from cold rolled steel.

Dimensioning of an anvil as described above results in an anvil top plate 33 which when excited by the ultrasonic energy undergoes flexural motion. The parts 12 are disposed on the plate 33 of the anvil as shown in FIG. 3, and the front surface 28 of the horn 26 is placed in intimate contact with the runner 10. When the horn is rendered resonant at a predetermined ultrasonic frequency, the plate 33 of the anvil 30 undergoes flexural motion of a substantial amplitude at a frequency less than that of the predetermined ultrasonic frequency. Typically, the plate 33 dimensioned to undergo flexural motion will undergo such motion at a frequency in the range between 20 Hz and 15 kHz depending upon the dimensioning of the anvil 30 and slot 32. In any event, the resonant frequency of the plate 33 is less than the frequency of the applied sonic or ultrasonic energy from the horn 26. The force applied between the horn 26 and runner 10 is of a relatively low magnitude, in the order of five psig. Using an anvil 30 of the type described, the plate of the anvil 30, and hence the parts 10 will undergo a peak-to-peak motional displacement in the range of approximately 0.1 to 0.25 inch (2.5 mm to 6.5 mm) at a frequency in the order of 20 Hz.

The combination of 20 kHz ultrasonic energy applied by the horn 26 to the runner 10 and the gross motional displacement of the plate 33 of anvil 30 and, hence, of the parts 12 results in degating of a plurality of heated nylon parts 12 from the runner 10 within several seconds. After degating, prolonged contact between the horn and runner has no adverse affect on the parts 12 since the parts have already been separated from the runner 10.

The ultrasonic energy may be applied by means of a hand held tool, comprising a horn and converter, as shown in FIG. 3. Alternatively, in a preferred embodiment, the converter, horn and anvil may be parts of a commercially available ultrasonic welding apparatus or an apparatus such as that described in U.S. Pat. No. 3,790,059 entitled "Ultrasonic Apparatus".

Figure 4:
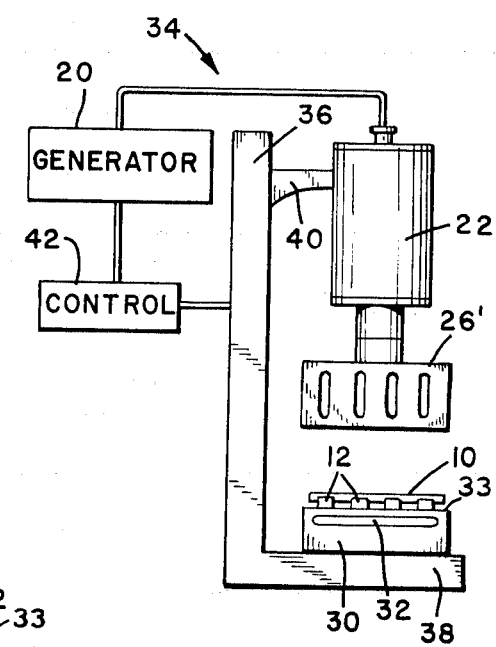
FIG. 4 is a schematic representation of a preferred apparatus for practicing the invention.

In FIG. 4 a preferred embodiment of an apparatus for practicing the invention is shown. Numeral 34 refers to a welding stand having a vertical column 36 and a base plate 38. Mounting means 40 supports the converter 22 and rectangular bar horn 26' assembly. The anvil 30 is coupled to the base plate 38, for instance, by a plurality of fasteners. Responsive to motive means, not shown, the converter and horn are adapted to move reciprocatingly along column 36 from the raised position shown toward the anvil 30 and return to the raised position. The operation of the welding stand is controlled by means of control unit 42 for operating the motive means and generator 20 in a predetermined sequence as is well known in the art.

The apparatus shown in the schematic diagrams of FIGS. 3 and 4 illustrate a tapered cylindrical horn 26 and a rectangular bar horn 26'. It will be apparent that horns of other configurations or so-called composite horns may be used, the construction of which are well known in the art. See, for instance, the book "Ultrasonic Engineering" by Julian Frederick, John Wiley & Sons, Inc., New York, N.Y. (1965) pages 87–103, or U.S. Reissue Pat. No. 28,642.

It will be apparent that the described multiple and simultaneous degating method and apparatus is both extremely fast and more convenient than the heretofore used method and apparatus. The use of an anvil plate exhibiting substantial motion at a frequency less than that of the frequency of the applied ultrasonic energy in combination with a conventional ultrasonic apparatus including a horn for applying ultrasonic energy at a predetermined frequency has proven particularly effective in degating hot parts.

While there has been described and illustrated a preferred method and apparatus for degating parts from a runner, it will be apparent to those skilled in the art that modifications and variations may be made without deviating from the broad principle of the invention which shall be limited solely by the scope of the appended claims.

What is claimed is:

1. The method of simultaneously degating a plurality of molded thermoplastic parts which are joined to a runner by respective gates comprising the steps of:
   disposing the parts while joined to the runner upon an anvil plate dimensioned to undergo flexural motion, said anvil plate forming the top plate of an anvil;
   providing a source of ultrasonic energy including a horn dimensioned to be resonant as a half wavelength resonator when energized with ultrasonic energy at a predetermined frequency coupled thereto, and
   coupling said horn when rendered resonant to said runner whereby to subject said runner to ultrasonic energy and to cause said anvil plate to undergo flexural motion in the range of approximately 0.1 to 0.25 inch peak-to-peak displacement at a frequency less than that of predetermined frequency to cause a burnout of the respective gates and freeing said parts from connection to said runner.

2. An apparatus for simultaneously degating a plurality of molded thermoplastic parts which are joined to a runner by respective gates comprising:

an ultrasonic horn dimensioned to be resonant as a half wavelength resonator when energized with ultrasonic energy of predetermined frequency at an input end and adapted to provide ultrasonic vibrations at an opposite output end, and an anvil being a block of material having a through slot located near the top surface of the block extending to almost both sides of the block, that portion of the block disposed between the slot and the top surface of the block being an anvil plate dimensioned to undergo flexural motion at a frequency less than that of said predetermined frequency and at a substantially large amplitude disposed opposite said output end of said horn for causing degating of parts from said runner in response to a runner being disposed on said anvil plate and said output end providing ultrasonic vibrations to the runner.

3. An apparatus for degating as set forth in claim 2, wherein said anvil plate is dimensioned to undergo motion in the range of approximately 0.1 to 0.25 inch peak-to-peak displacement.

4. An apparatus for degating as set forth in claim 2 wherein said anvil is metal.

5. An apparatus for degating as set forth in claim 4, wherein said metal is cold rolled steel.

* * * * *